United States Patent [19]
Berry et al.

[11] Patent Number: 6,094,196
[45] Date of Patent: Jul. 25, 2000

[54] INTERACTION SPHERES OF THREE-DIMENSIONAL OBJECTS IN THREE-DIMENSIONAL WORKSPACE DISPLAYS

[75] Inventors: Richard Edmond Berry; Scott Harlan Isensee, both of Georgetown; Shirley Lynn Martin, Austin, all of Tex.; David John Roberts, Stockton, United Kingdom

[73] Assignee: International Business Machines Corporation, Armonk, N.Y.

[21] Appl. No.: 08/887,807

[22] Filed: Jul. 3, 1997

[51] Int. Cl.[7] ............................................. G06F 15/00
[52] U.S. Cl. ............................................ 345/355; 345/349
[58] Field of Search .................................. 345/326–358

[56] References Cited

U.S. PATENT DOCUMENTS

| | | | |
|---|---|---|---|
| 5,255,354 | 10/1993 | Mahoney | 395/133 |
| 5,367,614 | 11/1994 | Bisey | 345/355 |
| 5,381,158 | 1/1995 | Takahara et al. | 345/355 |
| 5,408,597 | 4/1995 | Kita et al. | 395/140 |
| 5,422,987 | 6/1995 | Yamada | 345/355 |
| 5,455,904 | 10/1995 | Bouchet et al. | 395/157 |
| 5,528,735 | 6/1996 | Strasnick et al. | 345/355 X |
| 5,588,104 | 12/1996 | Lanier et al. | 395/326 |
| 5,594,844 | 1/1997 | Sakai et al. | 395/127 |
| 5,602,564 | 2/1997 | Iwamura et al. | 345/355 X |
| 5,608,850 | 3/1997 | Robertson | 345/355 X |
| 5,621,906 | 4/1997 | ONeill et al. | 345/355 |
| 5,689,628 | 11/1997 | Robertson | 345/355 X |
| 5,689,669 | 11/1997 | Lynch et al. | 345/355 |
| 5,736,982 | 4/1998 | Suzuki et al. | 345/355 X |
| 5,745,109 | 4/1998 | Nakano et al. | 345/355 X |
| 5,745,710 | 4/1998 | Clanton, III et al. | 345/355 X |
| 5,847,709 | 12/1998 | Card et al. | 345/355 |

OTHER PUBLICATIONS

Benford et al., "Supporting Cooperative Work in Virtual Environments", The Computer Journal, vol. 37, No. 8, pp. 653–667, 1994.

Carlsson et al., "DIVE—a MultiUser Virtual Reality System", IEEE, pp. 394–400, 1993.

Benford et al., "VR–VIBE: A Virtual Environment for Co–operative Information Retrieval", Eurographics '95., pp. 349–360, 1995.

Robinett, "Interactivity and Individual Viewpoint in Shared Virtual Worlds: The Big Screen vs. Networked Personal Displays", Computer Graphics, pp. 127–130, May 1994.

*Primary Examiner*—Steven Sax
*Attorney, Agent, or Firm*—J. B. Kraft; Volel Emile

[57] ABSTRACT

A system, method and computer program are provided for a virtual three-dimensional workspace with means for navigating the user's viewpoint into said workspace. Potentially interactive three-dimensional objects are positioned within the workspace. There is provided for each object an interaction sphere having a preselected radius. This interaction sphere is stored in association with its corresponding object. It remains a characteristic of the object so that when, during navigation, the user's viewpoint comes within the interaction sphere of a particular object, that object is rendered interactive. In addition, the object which is rendered interactive is usually highlighted in some manner so as to inform the user that he may functionally interact with the object.

12 Claims, 5 Drawing Sheets

INTERACTION SPHERES OF THREE-DIMENSIONAL OBJECTS IN THREE-DIMENSIONAL WORKSPACE DISPLAYS

CROSS-REFERENCE TO RELATED PATENT APPLICATIONS

Copending application, "BACK AWAY NAVIGATION FROM THREE-DIMENSIONAL OBJECTS IN THREE-DIMENSIONAL WORKSPACE INTERACTIVE DISPLAYS", Richard E. Berry et al. (Attorney Docket No. AT9-97-028), relates to a navigation system which tracks a progression of viewpoints of narrowing scope as the user approaches an object to be interacted with and then steps the viewer through viewpoints of progressively broadening scope as the viewer backs away from the object. Copending application, "DISTANCE DEPENDENT SELECTIVE ACTIVATION OF THREE-DIMENSIONAL OBJECTS IN THREE-DIMENSIONAL WORKSPACE INTERACTIVE DISPLAYS", Richard E. Berry et al. (Attorney Docket No. AT9-97-109) covers distance dependent viewpoints determining whether objects are individually interactive or non-interactive members of an interactive aggregate object.

TECHNICAL FIELD

The present invention relates to user interactive computer supported display technology and particularly to such user interactive systems and methods which are user friendly, i.e. provide even non-computer-literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/813,891 (Attorney Docket No. AT9-96-310), entitled "VIEWER INTERACTIVE OBJECT IN VIRTUAL THREE-DIMENSIONAL WORKSPACE", filed Mar. 7, 1997, and Ser. No. 08/813,848 (Attorney Docket No. AT9-96-311), entitled "VIEWER INTERACTIVE OBJECT WITH MULTIPLE SELECTABLE FACE VIEWS IN VIRTUAL THREE-DIMENSIONAL WORKSPACE", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., Computer Graphics Publication, Vol. 24, No. 4, August 1990, pp. 171–175, as well as in its related U.S. Pat. No. 5,276,785.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in a landscape which may have an almost infinite number of objects, it is important to keep the user focused on the objects with which he needs to relate interactively and keep the user aware of which objects he can interrelate with and which objects are not interactive.

The present invention addresses this problem, i.e. that of helping the interactive user in three-dimensional graphic environments to stay focused and relate to the objects he is seeking to relate to in the manner he is seeking to relate to such objects. In the three-dimensional workspace, there are virtually hundreds of objects with which the viewer may potentially interact. Since the workspace resembles the real world, a user cannot interact with every object at every level of navigation. Many of the objects are just too "far away" in virtual distances for the viewer to practically interact with the object. The above-referenced copending Berry et al. application (Attorney Docket No. AT9-97-109) is directed generally to a system for helping the user to narrow in on the object he wishes to interact with through a hierarchy of navigation levels through which the interactivity of individual objects and aggregate objects is continually changing. The present invention is concerned with the determination of when specific objects become interactive during such navigation.

SUMMARY OF THE INVENTION

The present invention provides the user with a relatively simple implementation for determining whether a particular object is interactive, i.e. user may functionally interact with the object. This is based on the virtual distance during navigation of a shifting viewpoint from the object in question. Each potentially interactive three-dimensional object has stored in association with the data defining the actual object, additional data defining an interaction sphere for that object having a virtual radius from the object center. Thus, wherever the object is positioned within the three-dimensional workspace, it will carry this surrounding sphere of interaction along with it. Then, if during navigation, the viewpoint of the user falls within this sphere, the object is rendered interactive and the user can functionally interact with the object. Conversely, if the viewpoint leaves the sphere, then the user can no longer interact with the particular object.

Before proceeding further and elaborating the present invention, it should be understood that in order to navigate through three-dimensional space, view the space or relate to objects within the space, a viewpoint is determined within that space. That viewpoint is the virtual position of the viewer or user who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint.

In accordance with more particular aspects of the present invention, it also includes means for highlighting a particular object when it becomes interactive during the above-described navigation. This may include means for maintaining the image visual resolution at a level which is less distinct when the object is not interactive and then rendering the image more distinct when the image is rendered interactive so that the user may see the details of the image needed for his interaction.

In accordance with another aspect of the present invention, the object which is rendered interactive by the viewpoint entering its interaction sphere is an aggregate object of the type described in the above-referenced copending application Berry et al. (Attorney Docket No. AT9-97-109). Such aggregate objects are combinations of individual objects each of which has its respective interaction sphere. However, at the point where the aggregate object is rendered interactive, the viewpoint is such that it is not within the interaction spheres of any of the individual objects, but is within the interaction sphere of the aggregate object. The interaction sphere of the aggregate object has a radius which is substantially greater than the radii of its individual objects because it is a necessity of a much larger object. The system of the present invention provides for the storage of data defining interaction spheres of aggregate objects along with the data defined in the aggregate object in the same manner as such interaction sphere data is stored in association with the individual objects.

It should be understood that in the case of such an aggregate object being in the interactive state, if the viewpoint is changed so that it enters the interaction sphere of any of the individual objects making up the aggregate object such individual objects are rendered user interactive.

DETAILED DESCRIPTION OF THE PREFERRED EMBODIMENT

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates. It is in this manner that the radii of the object interaction spheres of the present invention are defined as well as viewpoint distances from objects.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The three-dimensional workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation.

The three-dimensional objects which will be subsequently described in embodiments of the present invention may be implemented using object oriented programming techniques, such as the object oriented techniques described in the above-mentioned copending application Ser. No. 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods. Thus, in implementing the present invention, the interaction spheres of objects as defined by their radii may be regarded and stored as part of the software entity.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+ variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing. Those skilled in the art will understand how the present invention is implemented using object oriented programming techniques as described above.

With this background of the various expedients which may be used to implement the present invention, the preferred embodiments will now be described.

Figure 1:
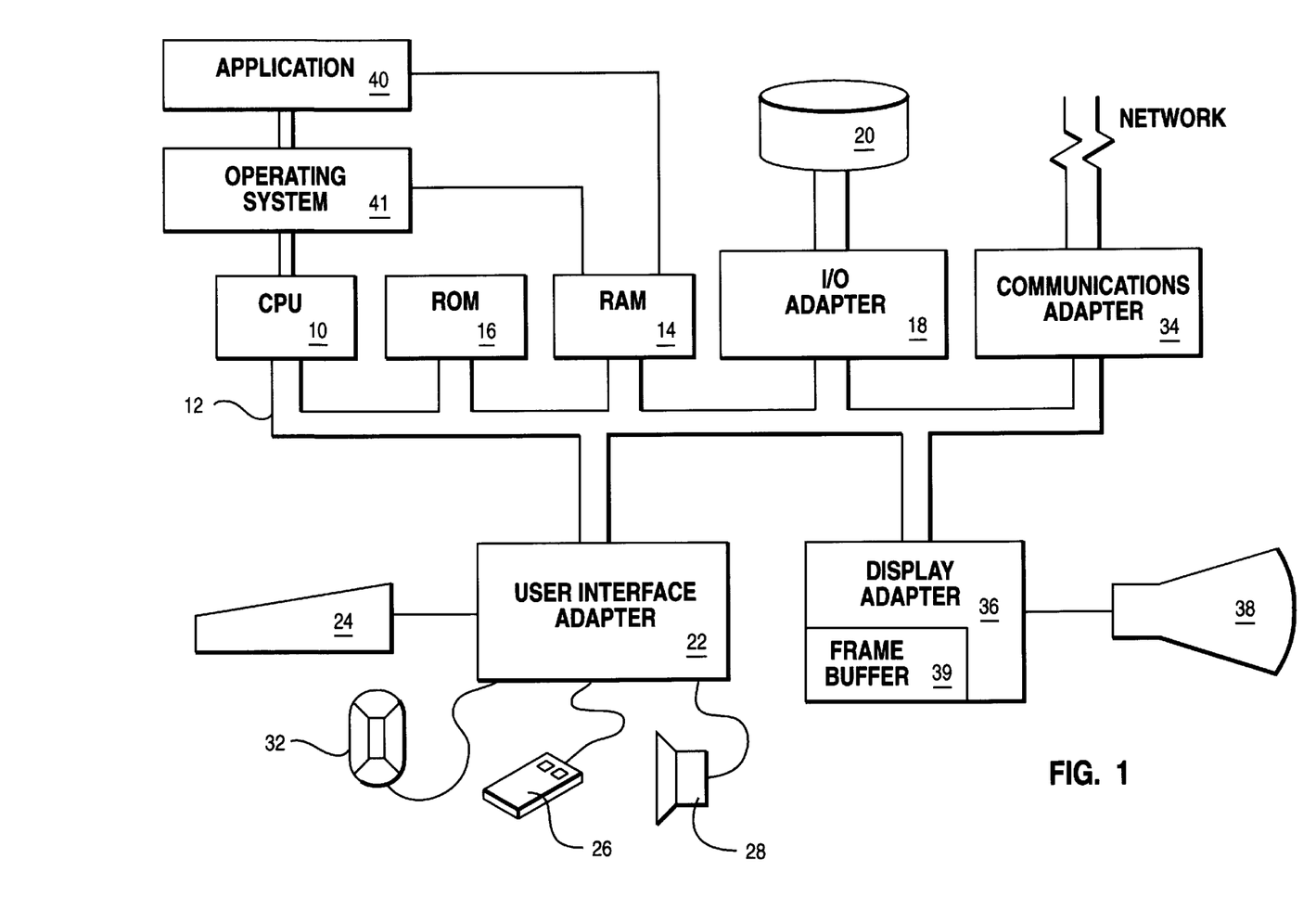
FIG. 1 is a block diagram of a data processing system including a central processing unit which is capable of implementing the present invention.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. An embodiment will be described with respect to a virtual reality three-dimensional workspace of the type shown in FIG. 2. The three-dimensional workspace of FIG. 2 may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as the operating system 41 in which the application 40 operates.

Figure 2:
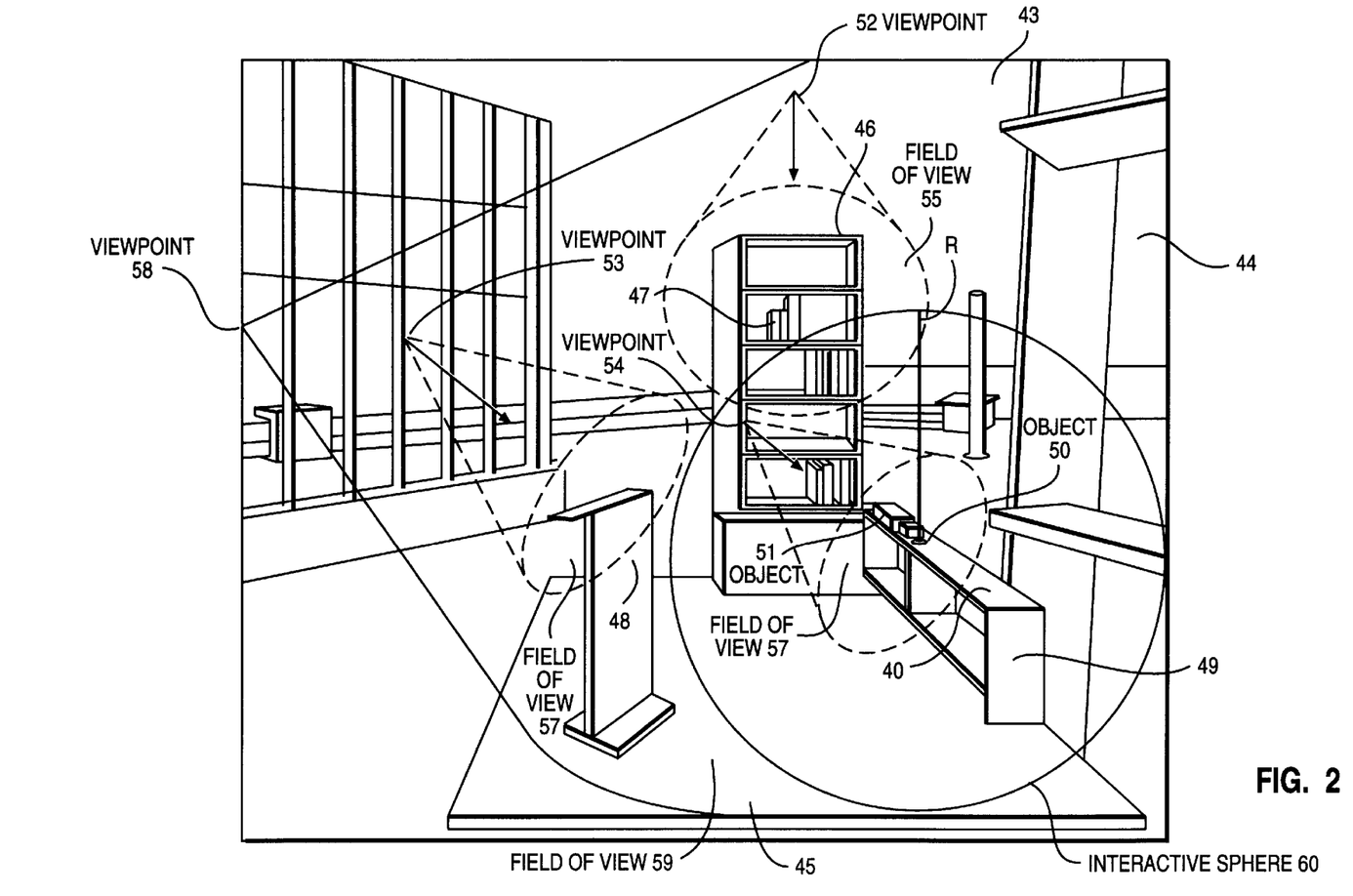
FIG. 2 is a representation of a three-dimensional workspace in accordance with the present invention containing objects and illustrating viewpoints, fields of view, as well as particular objects and interaction spheres for such objects.

The workspace shown in FIG. 2 is a portion of an even greater virtual reality workspace which will be understood to include various indoor and outdoor structures such as offices, living areas, entertaining areas, buildings, roads, etc. With all of these possibilities and possible paths, it may be readily seen how this virtual reality three-dimensional world is potentially quite complex and confusing to the viewer. The present invention is directed to making this world less confusing to the viewer by helping the viewer hone in on objects to which he wishes to functionally relate.

Figure 3:
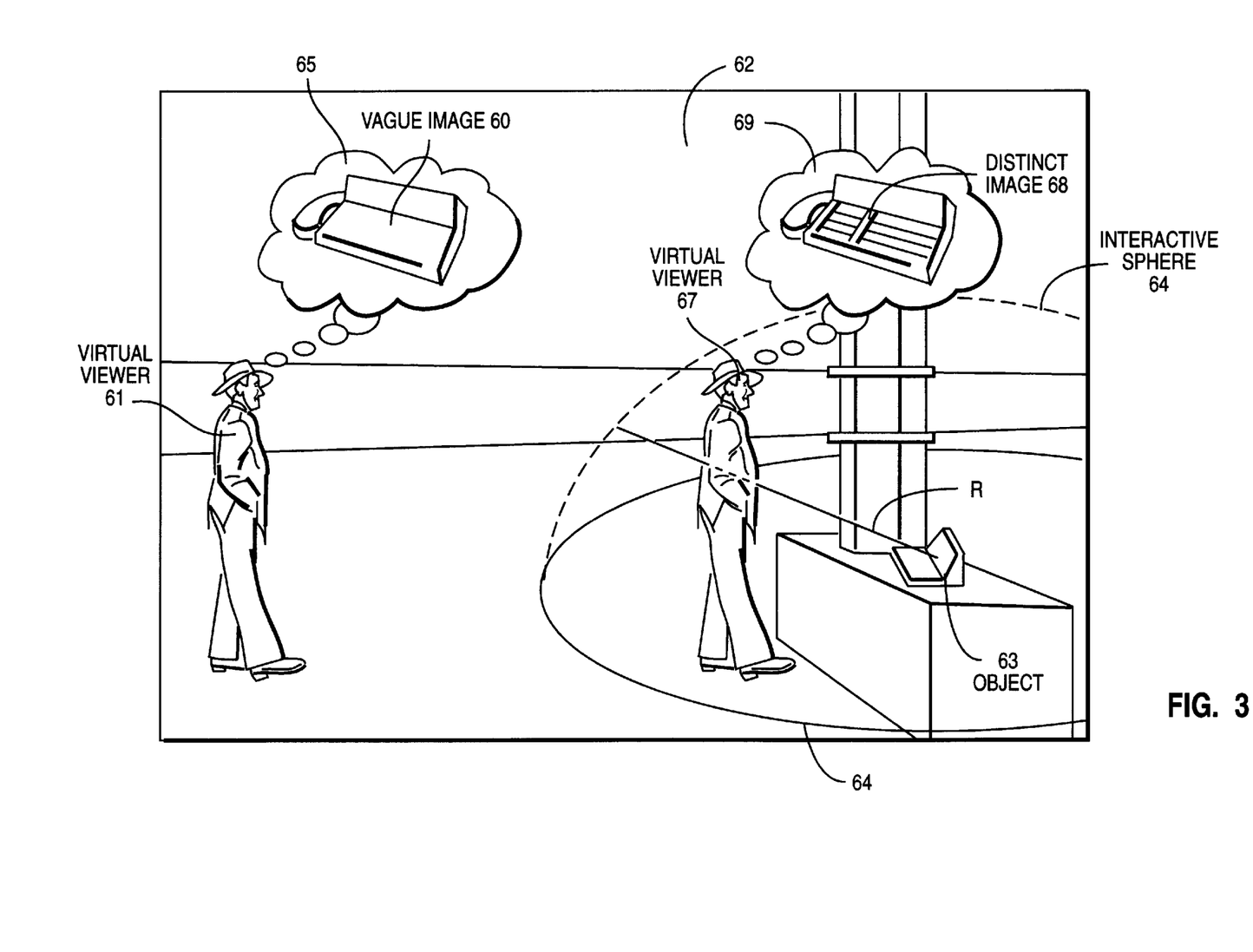
FIG. 3 is a diagrammatic illustration relating to a simplified workspace to more clearly show the object interaction sphere in accordance with the present invention.

We will now describe the present invention with respect to the images of FIGS. 2 and 3. In FIG. 2 there is illustrated a high level or broad viewpoint into a workspace 43. The workspace is divided into several broad regions: an exterior region 44 and an interior region 45. The workspace which has been made relatively bare for purposes of this illustration contains several objects such as bookcase 46 containing books 47, podium 48, desk 49 which in turn includes a pair of desktop objects 50 and 51. In order to illustrate the point of this invention as simply as possible, we will refer to objects 50 and 51 as just general desktop objects. There are several viewpoints 52, 53 and 54, with respective fields of view 55, 56 and 57. Viewpoints 52, 53 and 54 should be considered as closeup viewpoints as they are intended to get close enough to specific individual objects so as to render the specific objects user interactive. There is also a viewpoint 58 at a more distant level which has a field of view 59 which is much broader in scope and includes many objects.

As set forth hereinabove, the present invention provides for interaction spheres associated with each of the potentially interactive objects. One of these interaction spheres shown diagrammatically as projection 60 has a radius R projecting from the center of desktop object 50. As will hereinafter be described in greater detail with respect to FIG. 3, since viewpoint 54 is within the sphere 60, then desktop object 50 is rendered interactive and if during the navigation within workspace 43, the user is at viewpoint 54, he may then interact with desktop object 50 for whatever functional purpose the desktop object 50 is set up for. It should be noted that field of view 57 is shown as being highlighted which indicates that desktop objects 50 and 51 within the field of view from viewpoint 54 are highlighted because viewpoint 54 is within the respective spheres of desktop object 50 shown as sphere 60 and the sphere of desktop object 51 which is not shown. Accordingly, if the viewpoint is shifted to either point 52, 53 or 58 during navigation, desktop objects 50 and 51 would be noninteractive since these other viewpoints are outside the interaction spheres of such desktop objects.

It should be further understood that while individual objects such as bookcase 46, books 47, podium 48, desk 49 and desktop objects 50 and 51 would be noninteractive if the navigation were at viewpoint 58, for some general interactive purposes, these objects could be combined to form an aggregate object having an interaction sphere with a radius so large as to include viewpoint 58. In such a case, the aggregate object formed by the combination of these individual objects could be rendered user interactive for some general functions which could be defined by the designer of the three-dimensional system.

With this general background, we will refer to FIG. 3 in order to more clearly illustrate the basic principle of the present invention: the interaction sphere. We will illustrate in terms of person 61 at an initial position in a workspace 62. The person will be the metaphor for the viewpoint. The person or user 61 wishes to interactively use telephone system 63. The interaction sphere of telephone system 63 is illustrated by dome 64 which has a radius R extending from the center of telephone system object 63. When the person is at position 61, the telephone system is not interactive because he is outside of interaction sphere 64. This is diagrammatically illustrated by balloon image 65 which purports to show what the individual sees which is a vague and indistinct image of the telephone system 63. Let us now assume that our illustrative person moves closer to the telephone system object 63 and is now at position 67 so that his viewpoint is within the limits of sphere 64, i.e. it is closer to the object than radius R. Telephone system object 63 is now rendered interactive so that the user can functionally relate to it and it becomes sufficiently distinct in its image to support this functional interaction. The distinct image 68 of telephone system 63 is shown in balloon 69 which illustrates what the viewer sees when the telephone system is rendered interactive: it becomes much more distinct.

We have been describing the movement of the viewpoint by navigation. In accordance with conventional techniques, the user may control the viewpoint through conventional I/O devices such as mouse 26 in FIG. 1, which operates through user interface 22 to call upon the VRT programs in RAM 14 cooperating with the operating system 41 to create the images in frame buffer 39 of display adapter 36 to control the display on monitor 38. Viewpoint 54 may be changed using conventional virtual three-dimensional workspace navigation techniques. The viewpoint interface which is manifested as a three-dimensional virtual reality view into the workspace as shown in FIG. 2 is changeable as the user moves closer or backs away from objects in the workspace or moves to the right or left or up or down in the workspace. All this may be controlled by a suitable conventional I/O device such as mouse 26 of FIG. 1. While the movement in FIGS. 3 through 6, for simplicity of illustration, will be presented in a single plane, it should be understood that the movement may be along any lines in the three orthogonal, X, Y and Z directions.

Figure 4A:
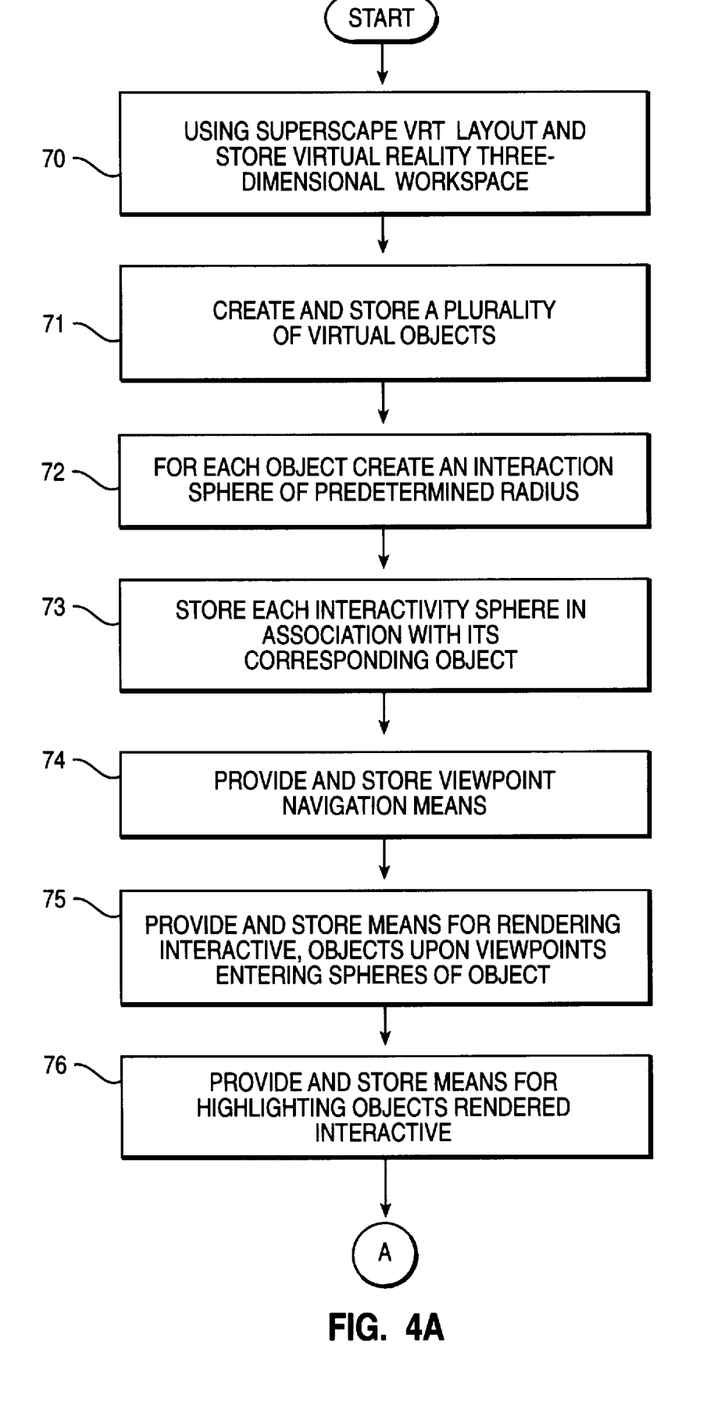
FIGS. 4A and 4B are flowcharts of a process implemented by the present invention for carrying out an embodiment of the present invention.
Figure 4B:
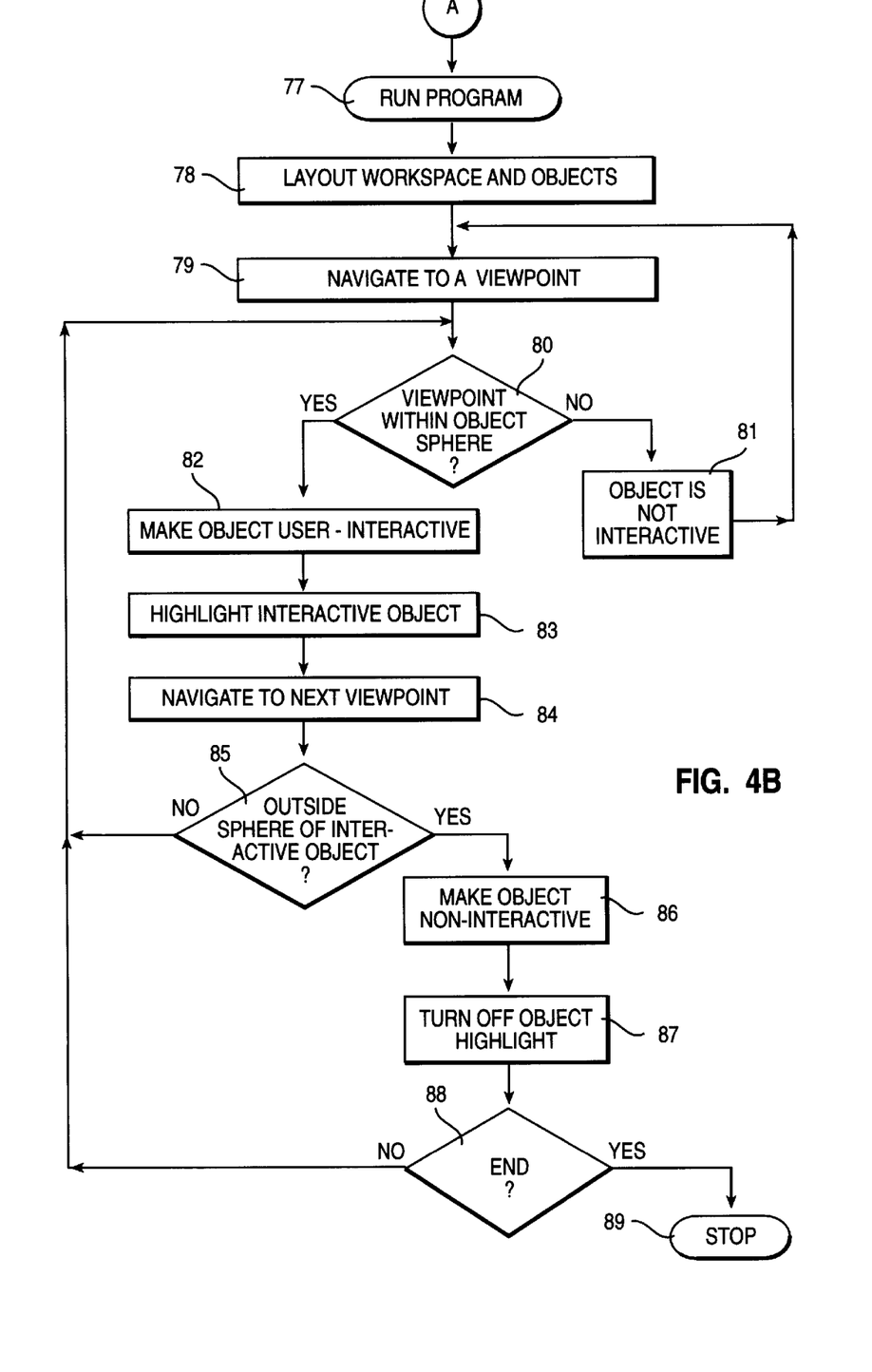

With reference to FIGS. 4A and 4B, we will now describe the process involved in the present invention. FIG. 4A describes the steps relating to the creation of a virtual reality three-dimensional landscape, creation and storage of a plurality of three-dimensional objects which will be positioned in such a landscape. FIG. 4B describes how particular objects are rendered interactive and noninteractive based upon the movement of the viewpoint via navigation and the position of resulting viewpoints with respect to the interaction spheres associated with each of the objects.

Thus, in FIG. 4A, first, step 70, the desired virtual reality three-dimensional workspace, which is the workspace shown in FIG. 2, is created. Then, step 71, there is created and stored a plurality of three-dimensional virtual objects. Also, step 72, there is created for each object an interaction sphere having a predetermined radius, and the data defining the interaction sphere is stored in association with the particular object to which it relates, step 73. Then, step 74, conventional viewpoint navigation means is provided and stored. There is also provided, step 75, means for rendering interactive those objects which upon viewpoint navigation, have viewpoints within their interaction spheres. Finally, step 76, there is provided and stored means for highlighting objects which are rendered interactive. These means may be means for just making the interactive objects brighter, as illustrated with respect to FIG. 2, or the highlighting may involve making the objects with viewpoints within the interaction sphere more visually distinct, as illustrated with respect to FIG. 3.

The process now proceeds via entry point "A" to FIG. 4B where the created virtual reality programs are run, step 77. The program initially sets up the workspace and object layout, step 78. Then, the viewer navigates to a viewpoint, step 79; if the viewer wishes to interact with a particular object or objects, he navigates so that he approaches the object. From this viewpoint, a determination is made, step 80, as to whether the viewpoint is within the interaction sphere of the object with which the user wishes to interact. If the viewpoint is not within this interaction sphere, then the process moves to step 81 where the object is maintained as not interactive and the flow returns to step 79 to await further navigation to a different viewpoint. On the other hand, if it is determined in decision block 80 that the viewpoint is within the sphere, then, step 82, the object is rendered user interactive, and it is highlighted. The highlighting may be done by making the object brighter or it may be done as will be described with respect to FIG. 3 by making the object more visually distinct.

After the object is highlighted, the system navigates to the next viewpoint, step 84, after which a determination is made in decision block 85 as to whether this navigation has caused the viewpoint to fall out of the interaction sphere of this interactive object. If the decision is no, i.e. the viewpoint is still within the interaction sphere of the object, then the system returns to decision block 80 where a determination is made as to whether the subsequent navigation step has brought the viewpoint within the interaction sphere of any other object. On the other hand, if the decision from step 85 is yes, i.e. the viewpoint is now outside of the interaction sphere of the object, then, step 86, the object is rendered noninteractive, the highlight is turned off and the process moves to decision block 88 where a determination is made as to whether the user wishes to end the session. If the user wishes to end the session, the session is stopped, step 89. On the other hand, if the user wants to continue, the system returns to decision block 80 where a determination is made as to whether the navigation to the next viewpoint has resulted in that viewpoint being within the interaction sphere of another object.

Although certain preferred embodiments have been shown and described, it will be understood that many changes and modifications may be made therein without departing from the scope and intent of the appended claims.

What is claimed is:

1. A data processor controlled display system for displaying a virtual three-dimensional workspace comprising:

means for displaying a plurality of virtual three-dimensional objects within said workspace;

user interactive navigation means for moving users to a plurality of viewpoints within said workspace;

means for storing in association with each of a plurality of said virtual objects, a respective interaction sphere having a selected virtual radius from the object center, and means responsive to moving a user to a viewpoint within said interaction sphere of a selected object for rendering the selected object user interactive, said selected objects being an aggregate object comprising a plurality of noninteractive objects.

2. The display system of claim 1 further including means for highlighting said selected object upon said object becoming interactive.

3. The display system of claim 2 wherein said selected object is less distinct when not interactive and distinct when rendered interactive.

4. The display system of claim 1 further including:

means for storing in association with at least one of said plurality of noninteractive objects, an interaction sphere having a selected virtual radius from the object center, and means responsive to moving a user to a viewpoint within the interaction sphere of said noninteractive object for rendering said noninteractive object user interactive.

5. A computer implemented method for displaying a virtual three-dimensional workspace comprising:

displaying a plurality of virtual three-dimensional objects within said workspace;

user interactively moving users to a plurality of viewpoints within said workspace;

storing in association with each of a plurality of said virtual objects, a respective interaction sphere having a selected virtual radius from the object center; and in response to moving a user to a viewpoint within said interaction sphere of a selected object, rendering the selected object user interactive, said selected objects being an aggregate object comprising a plurality of noninteractive objects.

6. The method of claim 5 further including the steps of highlighting said selected object upon said object becoming interactive.

7. The method of claim 6 wherein said selected object is less distinct when not interactive and distinct when rendered inactive.

8. The method of claim 5 further including the steps of:
storing in association with at least one of said plurality of noninteractive objects, an interaction sphere having a selected virtual radius from the object center, and in response to moving a user to a viewpoint within the interaction sphere of said noninteractive object for rendering said noninteractive object user interactive.

9. A computer program having data structures included on a computer readable medium which causes the display on a data processor supported display of a virtual three-dimensional workspace comprising:
means for displaying a plurality of virtual three-dimensional objects within said workspace;
user interactive navigation means for moving users to a plurality of viewpoints within said workspace;
means for storing in association with each of a plurality of said virtual objects, a respective interaction sphere having a selected virtual radius from the object center, and means responsive to moving a user to a viewpoint within said interaction sphere of a selected object for rendering the selected object user interactive, said selected objects being an aggregate object comprising a plurality of noninteractive objects.

10. The computer program according to claim 9 further including means for highlighting said selected object upon said object becoming interactive.

11. The computer program according to claim 10 wherein said selected object is less distinct when not interactive and distinct when rendered interactive.

12. The computer program according to claim 9 further including:
means for storing in association with at least one of said plurality of noninteractive objects, an interaction sphere having a selected virtual radius from the object center, and means responsive to moving a user to a viewpoint within the interaction sphere of said noninteractive object for rendering said noninteractive object user interactive.

* * * * *